(12) United States Patent
Kim et al.

(10) Patent No.: US 8,346,508 B2
(45) Date of Patent: Jan. 1, 2013

(54) SYSTEM AND METHOD FOR DIAGNOSING HOME APPLIANCE

(75) Inventors: Hyun Sang Kim, Changwon-si (KR); Eui Hyeok Kwon, Changwon-si (KR); Hae Yong Kang, Changwon-si (KR); Yong Tae Kim, Changwon-si (KR); Koon Seok Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 177 days.

(21) Appl. No.: 12/757,205

(22) Filed: Apr. 9, 2010

(65) Prior Publication Data

US 2010/0318324 A1  Dec. 16, 2010

Related U.S. Application Data

(60) Provisional application No. 61/168,372, filed on Apr. 10, 2009.

(30) Foreign Application Priority Data

Apr. 10, 2009  (KR) .................. 10-2009-0031500

(51) Int. Cl.
*G06F 11/07* (2006.01)
*G06F 19/00* (2006.01)

(52) U.S. Cl. ...... 702/183; 702/185; 340/679; 340/691.1
(58) Field of Classification Search .................. 702/183; 379/93.29, 106, 108; 340/679
See application file for complete search history.

(56) References Cited

U.S. PATENT DOCUMENTS

| | | |
|---|---|---|
| 3,910,322 A | 10/1975 | Hardesty et al. |
| 4,766,505 A | 8/1988 | Nakano et al. |
| 4,897,659 A * | 1/1990 | Mellon ............... 342/45 |
| 5,103,214 A | 4/1992 | Curran et al. |
| 5,268,666 A | 12/1993 | Michel et al. |
| 5,452,344 A | 9/1995 | Larson |
| 5,506,892 A | 4/1996 | Kojima et al. |
| 5,757,643 A | 5/1998 | Kuroda et al. |

(Continued)

FOREIGN PATENT DOCUMENTS

EP          0 038 687          10/1981

(Continued)

OTHER PUBLICATIONS

International Search Report dated Apr. 25, 2011 issued in Application No. PCT/KR 2010/004407.

(Continued)

*Primary Examiner* — Michael Nghiem
*Assistant Examiner* — Alexander Satanovsky
(74) *Attorney, Agent, or Firm* — Ked & Associates LLP

(57) ABSTRACT

A system and method for diagnosing a home appliance are disclosed. The home appliance outputs product information as a predetermined sound signal, and transmits the sound signal to a service center of a remote site over a communication network, such that a service technician of the service center can easily check a current status of the home appliance. When a diagnostic server of the service center analyzes the sound signal of the home appliance, it selects a plurality of preamble candidates and can effectively and correctly detect data using weights, so that it can quickly diagnose a faulty operation of the home appliance. An erroneous data analysis and its associated erroneous diagnosis are prevented, so that the diagnostic system provides a service for more correctly diagnosing a faulty operation of the home appliance and also increases user satisfaction and reliability of the home appliance.

11 Claims, 10 Drawing Sheets

U.S. PATENT DOCUMENTS

| | | | |
|---|---|---|---|
| 5,774,529 A | 6/1998 | Johannsen et al. | |
| 5,864,828 A * | 1/1999 | Atkins | 705/36 R |
| 5,940,915 A | 8/1999 | Nam | 8/159 |
| 5,987,105 A * | 11/1999 | Jenkins et al. | 379/106.01 |
| 6,121,593 A | 9/2000 | Mansbery et al. | |
| 6,763,458 B1 | 7/2004 | Watanabe et al. | 713/100 |
| 6,778,868 B2 | 8/2004 | Imamura et al. | |
| 6,870,480 B2 | 3/2005 | Suzuki et al. | |
| 6,906,617 B1 | 6/2005 | Van der Meulen | |
| 7,135,982 B2 | 11/2006 | Lee | 340/635 |
| 7,266,164 B2 * | 9/2007 | Jeon et al. | 375/340 |
| 7,280,643 B2 | 10/2007 | Howard et al. | 379/93.37 |
| 7,337,457 B2 | 2/2008 | Pack et al. | 725/40 |
| 7,439,439 B2 | 10/2008 | Hayes et al. | 84/600 |
| 7,509,824 B2 | 3/2009 | Park et al. | 68/12.23 |
| 7,648,476 B2 | 1/2010 | Bock et al. | |
| 7,653,512 B2 | 1/2010 | Cheung et al. | 702/184 |
| 7,965,632 B2 * | 6/2011 | Sugaya | 370/231 |
| 8,027,752 B2 | 9/2011 | Castaldo et al. | |
| 8,040,234 B2 | 10/2011 | Ebrom et al. | 340/531 |
| 8,045,636 B1 * | 10/2011 | Lee et al. | 375/262 |
| 8,132,049 B2 | 3/2012 | Yasukawa et al. | |
| 8,204,189 B2 | 6/2012 | Rhodes et al. | |
| 2002/0078742 A1 | 6/2002 | Kim | 73/162 |
| 2002/0116959 A1 | 8/2002 | Ohta et al. | |
| 2003/0196492 A1 | 10/2003 | Remboski et al. | 73/593 |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0249903 A1 | 12/2004 | Ha et al. | |
| 2005/0086979 A1 | 4/2005 | Son et al. | |
| 2005/0129200 A1 | 6/2005 | Forrest et al. | 379/93.37 |
| 2005/0134472 A1 | 6/2005 | Jang et al. | |
| 2006/0066758 A1 | 3/2006 | Higashihara | |
| 2006/0136544 A1 | 6/2006 | Atsmon et al. | |
| 2006/0259199 A1 | 11/2006 | Gjerde et al. | |
| 2007/0189323 A1 | 8/2007 | Swoboda et al. | |
| 2008/0036619 A1 | 2/2008 | Rhodes et al. | |
| 2008/0122648 A1 | 5/2008 | Ebrom et al. | |
| 2009/0160637 A1 | 6/2009 | Maeng | |
| 2009/0323914 A1 | 12/2009 | Lee et al. | |
| 2010/0116060 A1 | 5/2010 | Murayama | 73/593 |
| 2011/0200189 A1 * | 8/2011 | True et al. | 380/44 |

FOREIGN PATENT DOCUMENTS

| | | |
|---|---|---|
| EP | 0 510 519 A1 | 10/1992 |
| EP | 0 617 557 A2 | 9/1994 |
| EP | 0 691 060 B1 | 1/1996 |
| EP | 0 742 308 | 11/1996 |
| EP | 0 846 991 | 6/1998 |
| EP | 0 851 054 | 7/1998 |
| JP | 4-358497 A | 12/1992 |
| JP | 2001-353395 A | 12/2001 |
| JP | 2002-000988 A | 1/2002 |
| JP | 2002-011274 A | 1/2002 |
| JP | 2002-045590 A | 2/2002 |
| JP | 2002-162149 | 6/2002 |
| JP | 2007-267956 A | 10/2007 |
| JP | 2008-003562 A | 1/2008 |
| KR | 10-1991-0020404 A | 12/1991 |
| KR | 10-1996-003308 A | 1/1996 |
| KR | 10-1996-0003308 A | 1/1996 |
| KR | 10-1997-0019443 A | 4/1997 |
| KR | 10-0127232 B1 | 10/1997 |
| KR | 10-0143209 | 8/1998 |
| KR | 20-1999-0040564 U | 12/1999 |
| KR | 20-0162050 | 12/1999 |
| KR | 10-2000-0018678 A | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-0389690 B1 | 6/2003 |
| KR | 10-0406094 B1 | 11/2003 |
| KR | 10-2004-0050767 | 6/2004 |
| KR | 10-2004-0095017 | 11/2004 |
| KR | 10-2005-0062747 A | 6/2005 |
| KR | 10-2005-0097282 A | 10/2005 |
| KR | 10-0564761 B1 | 3/2006 |
| KR | 10-2006-0103014 | 9/2006 |
| KR | 10-0641974 | 11/2006 |
| KR | 10-2007-0013090 A | 1/2007 |
| KR | 10-2008-0068447 | 7/2008 |
| KR | 10-0887575 | 3/2009 |
| KR | 10-2010-0112950 | 10/2010 |
| KR | 10-2011-0010378 | 2/2011 |
| WO | WO 01/11575 | 2/2001 |
| WO | WO 2008/010670 | 1/2008 |

OTHER PUBLICATIONS

United States Office Action dated Dec. 27, 2011 issued in U.S. Appl. No. 12/432,184.

United States Office Action dated Feb. 10, 2012 issued in U.S. Appl. No. 12/568,022.

United States Office Action dated Feb. 14, 2012 issued in U.S. Appl. No. 12/431,910.

United States Office Action dated Mar. 1, 2012 issued in U.S. Appl. No. 12/846,040.

International Search Report dated Dec. 1, 2010 (PCT/KR2010/002211).

International Search Report dated Dec. 1, 2010 (PCT/KR2010/002222).

International Search Report dated Dec. 18, 2009 issued in Application No. PCT/KR2009/002288.

International Search Report dated Dec. 21, 2009 issued in Application No. PCT/KR2009/002199.

International Search Report dated Jan. 4, 2010 issued in Application No. PCT/KR2009/002211.

International Search Report dated Aug. 23, 2010 issued in Application No. PCT/KR2010/000319.

Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).

European Search Report dated Oct. 14, 2011 issued in Application No. 09 73 8950.

PCT International Search Report dated May 26, 2011 issued in Application No. PCT/KR2010/005108.

Russian Office Action dated Feb. 7, 2012. (with translation).

U.S. Office Action issued in U.S. Appl. No. 12/431,903 dated Mar. 8, 2012.

U.S. Office Action issued in U.S. Appl. No. 12/431,893 dated Mar. 19, 2012.

U.S. Office Action issued in U.S. Appl. No. 12/432,132 dated Mar. 20, 2012.

U.S. Office Action issued in U.S. Appl. No. 12/432,111 dated May 2, 2012.

European Search Report dated May 8, 2012.

Milica Stojanovic; "Recent Advances in High-Speed underwater Communications"; IEEE Journal of Oceanice Engineering, IEEE Service Center; Piscataway, NJ; vol. 21, No. 2; Apr. 1, 1996; pp. 125-136 (XP011042321).

U.S. Office Action issued in U.S. Appl. No. 12/757,246 dated May 18, 2012.

U.S. Office Action issued in U.S. Appl. No. 12/757,339 dated May 22, 2012.

U.S. Notice of Allowance issued in U.S. Appl. No. 12/568,022 dated Jun. 11, 2012.

U.S. Office Action issued in U.S. Appl. No. 12/757,213 dated Jun. 25, 2012.

U.S. Office Action issued in U.S. Appl. No. 12/603,810 dated Jul. 5, 2012.

U.S. Office Action issued in U.S. Appl. No. 12/431,910 dated Jul. 23, 2012.

International Search Report issued in PCT Application No. PCT/KR2011/000311 dated Jul. 28, 2011.

U.S. Appl. No. 12/551,827, filed Sep. 1, 2009, Shirley Lu.

U.S. Appl. No. 12/757,205, filed Apr. 9, 2010, Alexander Satanovsky.

U.S. Appl. No. 12/757,232, filed Apr. 9, 2010.
U.S. Appl. No. 12/603,810, filed Oct. 22, 2009, Jennifer Mehmood.
U.S. Appl. No. 13/382,334, filed Jan. 5, 2012.
U.S. Appl. No. 12/842,649, filed Jul. 23, 2010, Andrew M. Schechter.
U.S. Appl. No. 12/842,679, filed Jul. 23, 2010, Benjamin C. Lee.
U.S. Appl. No. 12/846,013, filed Jul. 29, 2010, Benjamin C. Lee.
U.S. Appl. No. 12/847,272, filed Jul. 30, 2010, Andrew M. Schechter.
U.S. Appl. No. 12/847,303, filed Jul. 30, 2010, Benjamin C. Lee.
U.S. Appl. No. 12/847,406, filed Jul. 30, 2010, Andrew M. Schechter.
U.S. Appl. No. 12/847,284, filed Jul. 30, 2010, Andrew M. Schechter.
U.S. Appl. No. 12/847,306, filed Jul. 30, 2010, Andrew M. Schechter.
U.S. Appl. No. 12/850,240, filed Aug. 4, 2010, Brian A. Zimmerman.
U.S. Appl. No. 13/522,066, filed Jul. 13, 2012.
U.S. Appl. No. 13/562,704, filed Jul. 31, 2012.
Russian Office Action issued in Application No. 2010144513/08 dated Jun. 27, 2012.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
U.S. Appl. No. 12/842,649, filed Jul. 23, 2010, Xiugin Sun.
Korean Office Action dated Aug. 13, 2012.
U.S. Office Action issued in U.S. Appl. No. 12/757,232 dated Sep. 18, 2012.
U.S. Office Action issued in U.S. Appl. No. 12/847,303 dated Sep. 14, 2012.
U.S. Appl. No. 12/431,893, filed Apr. 29, 2009, Leshui Zhang.
U.S. Appl. No. 12/431,903, filed Apr. 29, 2009, Leshui Zhang.
U.S. Appl. No. 12/431,910, filed Apr. 29, 2009, Leshui Zhang.
U.S. Appl. No. 12/432,111, filed Apr. 29, 2009, Leshui Zhang.
U.S. Appl. No. 12/432,132, filed Apr. 29, 2009, Leshui Zhang.
U.S. Appl. No. 12/551,827, filed Sep. 1, 2009, Leshui Zhang.
U.S. Appl. No. 12/757,339, filed Apr. 9, 2010, Vishak Ganesh.
U.S. Appl. No. 12/568,022, filed Sep. 28, 2009, Phung Nguyen.
U.S. Appl. No. 12/757,213, filed Apr. 9, 2010, Philip A. Guyton.
U.S. Appl. No. 12/757,232, filed Apr. 9, 2010, Mohamed Charioui.
U.S. Appl. No. 12/757,246, filed Apr. 9, 2010, Vishak Ganesh.
U.S. Appl. No. 12/603,810, filed Oct. 22, 2009, Renee Dorsey.
U.S. Appl. No. 12/432,184, filed Apr. 29, 2009, Minh Chau Nguyen.
U.S. Appl. No. 13/382,334, filed Jan. 5, 2012, Scott T. Baderman.
U.S. Appl. No. 12/842,649, filed Jul. 23, 2010, Xiuqin Sun.
U.S. Appl. No. 12/842,679, filed Jul. 23, 2010, Tai T. Nguyen.
U.S. Appl. No. 12/846,013, filed Jul. 29, 2010, Shirley Lu.
U.S. Appl. No. 12/846,040, filed Jul. 29, 2010, Mark A. Fleischer.
U.S. Appl. No. 12/847,272, filed Jul. 30, 2010, Manuel L. Barbee.
U.S. Appl. No. 12/847,303, filed Jul. 30, 2010, Kerri L. McNally.
U.S. Appl. No. 12/847,406, filed Jul. 30, 2010, Manuel L. Barbee.
U.S. Appl. No. 12/847,284, filed Jul. 30, 2010, Manuel L. Barbee.
U.S. Appl. No. 12/847,306, filed Jul. 30, 2010, Manuel L. Barbee.
U.S. Appl. No. 12/850,240, filed Aug. 4, 2010, Omer S. Khan.
U.S. Appl. No. 13/522,066, filed Jul. 13, 2012, to be assigned.
U.S. Appl. No. 13/562,704, filed Jul. 31, 2012, to be assigned.
U.S. Appl. No. 13/588,164, filed Aug. 17, 2012, to be assigned.
Japanese Office Action dated Sep. 11, 2012.

* cited by examiner (a)

(b)

(a)

(b)

SYSTEM AND METHOD FOR DIAGNOSING HOME APPLIANCE

CROSS-REFERENCE TO RELATED APPLICATION

This application claims the benefit of U.S. Patent Application No. 61/168,372 filed on Apr. 10, 2009 in the USPTO, and Korean Patent Application No. 10-2009-0031500, filed on Apr. 10, 2009 in the Korean Intellectual Property Office, the disclosure of which is incorporated herein by reference.

BACKGROUND OF THE INVENTION

1. Field of the Invention

The present invention relates to a system and method for diagnosing a home appliance, and more particularly to a system and method for diagnosing a home appliance, which receive a sound signal from the home appliance and check a status of the home appliance by analyzing product information contained in the sound signal, such that after-sale service for the home appliance is facilitated.

2. Description of the Related Art

While a home appliance carries out a specific operation, it stores setup values required for the specific operation, information generated by the operation, malfunction or faulty operation information, etc. Specifically, the home appliance outputs a predetermined alarm sound signal when a malfunction or faulty operation occurs, such that a user who uses the home appliance can easily recognize a status of the home appliance. The home appliance informs the user of the operation completion or the malfunction occurrence, and at the same time outputs detailed malfunction information through an output unit (e.g., a display unit or a lamp).

In the meantime, if a malfunction or faulty operation occurs in the home appliance, the user informs an after-sale service center of the occurrence of malfunction or faulty operation by phone or E-mail, such that the user may ask advice of a service technician or ask the service technician to repair the faulty home appliance.

Generally, malfunction or fault information may be output externally through the home appliance, or may also be output as a fault code unknown to the user, such that the user has difficulty in properly solving such malfunction or fault of the home appliance. Although the user communicates with a service technician who works for the service center by phone or E-mail, the user may have difficulty in correctly explaining a faulty operation status of the home appliance to the service technician, such that the service technician may also have difficulty in providing a correct solution to the user. Although the service technician visits a home of the user who has requested after-sale service, the service technician does not recognize a correct status of the home appliance to be repaired, so that the repair of the home appliance generally takes a long time and much cost. For example, if the service technician who visits the home of the user does not have an appropriate component needed to repair the home appliance, the service technician must re-visit the corresponding home later after returning to the service center to retrieve the appropriate component, resulting in the occurrence of greater inconvenience and a long repair time.

In order to solve the above-mentioned problems, the home appliance may be connected to a server of the service center through a predetermined communication unit. However, a communication network must be implemented between each home and the service center.

U.S. Pat. No. 5,987,105 has disclosed an appliance communication system that converts fault information into a sound signal (e.g., a sound signal) having an audible frequency transmissible over a telephone network, and transmits the sound signal to the service center or the like through a telephone.

However, the above-mentioned related art disclosed in the U.S. Pat. No. 5,987,105 has difficulty in correctly detecting data when a sound signal is analyzed and diagnosed. In conclusion, there is needed an improved technology that allows a home appliance to output information using a sound signal, transmits the sound signal to a service center through a telephone line, and diagnoses a current status of the home appliance and the presence or absence of a faulty operation in such a manner that correct data detection is provided.

SUMMARY OF THE INVENTION

Accordingly, the present invention is directed to a diagnostic system and method for a home appliance that substantially obviate one or more problems due to limitations and disadvantages of the related art.

Therefore, the present invention has been made in view of the above problems, and it is an object of the present invention to provide a diagnostic system and method for a home appliance, in which, when the diagnostic system receives a predetermined sound signal having product information from the home appliance so as to analyze and diagnose a current status of the home appliance, the diagnostic system more correctly detects a preamble indicating the beginning of data contained in the sound signal, makes data detection easy, correctly analyzes data, and thus diagnoses a faulty operation, and a diagnostic method for the same.

In accordance with an aspect of the present invention, the above and other objects can be accomplished by the provision of a home appliance including a controller for dividing pre-stored product information into a plurality of data units upon receiving a signal output command, inserting a preamble between the divided data units, and generating a digital signal of a predetermined format, a converter for converting the digital signal into a modulated signal of a predetermined frequency band, and a sound output unit for outputting the modulated signal as a sound signal.

In accordance with another aspect of the present invention, there is provided a diagnostic system for a home appliance including at least one home appliance for outputting a sound signal including product information, and a diagnostic server for receiving the sound signal from the home appliance and diagnosing a faulty operation of the home appliance using the received sound signal, wherein the diagnostic server extracts a plurality of preamble candidates from the sound signal, detects a preamble for identifying the product information from the plurality of preamble candidates, extracts product information contained in the sound signal, and thus diagnoses a current status of the home appliance, a faulty operation, and the cause of the faulty operation.

In accordance with another aspect of the present invention, there is provided a diagnostic method for use in a diagnostic system of a home appliance including upon receiving a sound signal from the home appliance, extracting a plurality of preamble candidates from the sound signal, detecting a preamble from the plurality of preamble candidates by performing matching and weighting processes between the plurality of preamble candidates, detecting data including product information from the sound signal on the basis of the preamble, and diagnosing the home appliance by analyzing the product information.

As described above, the diagnostic system and method for the home appliance according to the present invention can effectively detect data including substantial home appliance information by correctly detecting a preamble from a signal received from the home appliance. As a result, the diagnostic system or method for the home appliance can quickly analyze and diagnose data, prevent misdiagnosis caused by incorrect data, greatly increase the accuracy of diagnosis of a current status of the home appliance, and also increase user satisfaction and reliability in terms of the service for diagnosing a malfunction or faulty operation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, exemplary embodiments of the present invention will be described in detail with reference to the annexed drawings.

Figure 1:
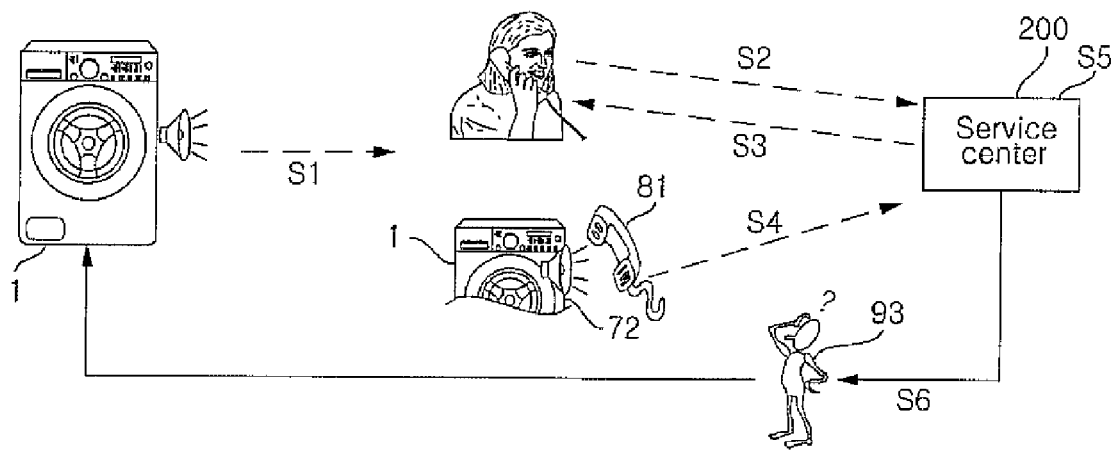
FIG. 1 schematically illustrates a diagnostic system including a home appliance according to one embodiment of the present invention.

FIG. 1 schematically illustrates a diagnostic system including a home appliance according to one embodiment of the present invention. Referring to FIG. 1, the diagnostic system includes a home appliance 1 separately installed at each place and a diagnostic server for diagnosing a status and fault of the home appliance.

The home appliance 1 includes a display unit and a sound output unit for outputting a sound signal.

If product information or status information of the home appliance 1 is output as a sound signal through the home appliance 1 installed at each home, a sound signal including the product information and the status information is transmitted to the diagnostic server of a service center 200 through a telephone line, such that the diagnostic server can diagnose the presence or absence of a faulty operation in the home appliance.

A user recognizes product information of the home appliance 1 through an output unit of the home appliance 1, controls operations of the home appliance 1, or requests after-sale service from the service center 200 at step S2.

The user who has a home appliance 1 to be repaired communicates with the service center by phone, E-mail or other mode of communication, receives an instruction message from a counselor or adviser of the service center at step S3, and operates an input unit embedded in the home appliance 1, such that the home appliance 1 outputs a sound signal detailing product information at step S4, and transmits the sound signal to the service center. In this case, the home appliance 1 according to the present invention is not limited only to a specific function for outputting product information, and is extended to another function for converting the product information into a predetermined sound signal and thus outputting the resultant sound signal.

In other words, when the user establishes a call connection with an adviser of the service center 200 at steps S2 and S3, the user moves a phone 81 close to an audible part of the home appliance 1, such that a sound signal S1 including product information or status information that is output when a malfunction or fault occurs in the home appliance 1 is transferred to the service center through a telephone line at step S4.

The adviser of the service center allows the home-appliance sound signal received through the telephone line to be stored in a diagnostic server. The diagnostic server analyzes the sound signal and thus diagnoses a product status of the home appliance 1 and the presence or absence of a faulty operation in the home appliance 1 at step S5.

In response to the diagnosis result of the home appliance 1, the service center 200 sends a service technician or repairman 93 to a home of the user who requested the after-sale service, such that the service technician can provide the user with a repair service suitable for a product status or a diagnosed fault at step S6. In this case, the diagnosis result is transferred to a portable terminal of the service technician 93 such that the service technician 93 can repair a faulty operation of the home appliance 1. Otherwise, the diagnosis result may also be transferred to the user through the adviser of the service center. In addition, the diagnosis result may be transferred to the user by E-mail or may also be transferred to the portable terminal of the user.

Therefore, if the user establishes a call connection with the service center through a communication network (e.g., a telephone line), the diagnostic system correctly recognizes a current status of the home appliance 1 through the sound signal and properly copes with the recognized status, such that a necessary service can be quickly provided to the user.

Now, although the term 'home appliance' disclosed in the present invention is exemplarily set to a washing machine for convenience of description and better understanding of the present invention, the scope or spirit of the term 'home appliance' is not limited thereto, but is applicable to other home appliances, for example, a television, a refrigerator, an electric rice cooker, a microwave oven, and the like.

The home appliance 1 can be configured as follows to output product information as a predetermined sound signal, such that the diagnostic server can diagnose the status or fault of the home appliance 1 on the basis of the sound signal including the product information.

Figure 2:
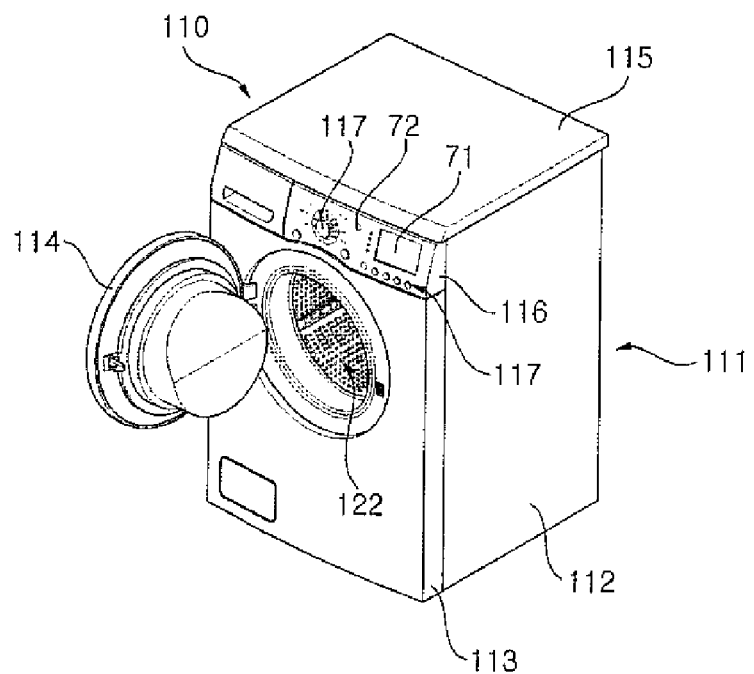
FIGS. 2(a) and 2(b) illustrate a home appliance and a relationship between the home appliance and a service center according to one embodiment of the present invention.
Figure 2:
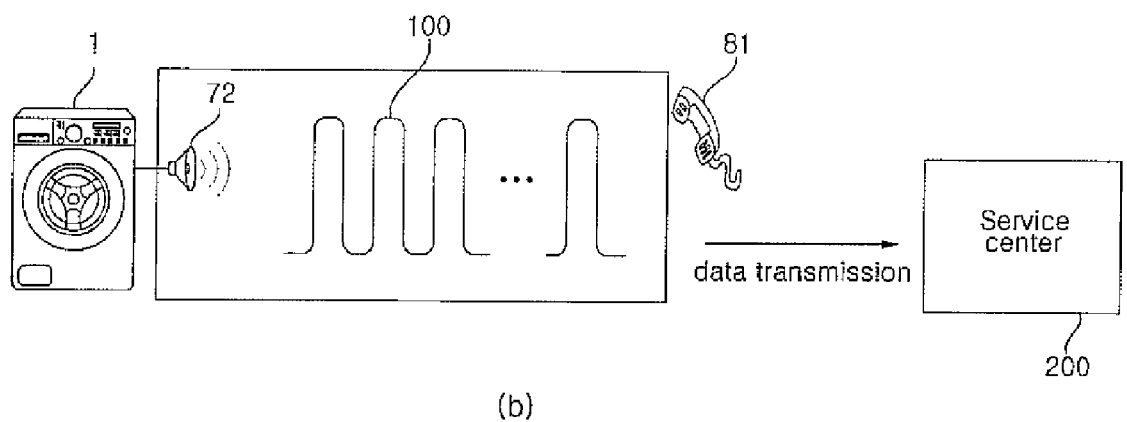

FIGS. 2(a) and 2(b) illustrate a home appliance and a relationship between the home appliance and a service center according to one embodiment of the present invention. As one example of the home appliance, a washing machine will be described in detail.

Referring to FIG. 2(a), the washing machine includes a cabinet 111, a tub 122 installed in the cabinet 111 to clean laundry or clothes, a motor (not shown) for driving the tub 122, a water provider (not shown) for providing clean water to the tub 122, and a drainage unit (not shown) for draining dirty or soiled water generated during the laundry cleaning.

The cabinet 111 includes a cabinet frame 112, a cabinet cover 113 that is located at an upper part of the cabinet frame 112 and is coupled to the cabinet frame 112, a control panel 116 that is located at an upper part of the cabinet cover 113 and controls operations of the washing machine, and a top plate 115 that is located at an upper part of the control panel 116 and coupled to the cabinet frame 112. The cabinet cover 113 includes a hole (not shown) via which laundry is placed in or withdrawn from the tub 122, and a door 114 that rotates to open or close the hole.

The control panel 116 includes a plurality of operation keys or buttons 117 to control operations of the washing machine 1, a sound output unit 72 for outputting a sound signal indicating an operation status of the washing machine 1, and a display unit 71 for displaying the operation status in the form of an image.

Referring to FIG. 2(b), if a faulty operation occurs in the washing machine 1, information about the faulty operation may be displayed on the display unit 71, or an alarm sound may be output. Therefore, if the faulty operation occurs in the washing machine 1, the user of the washing machine 1 communicates with the service center 200, receives an instruction message from an adviser of the service center, and thus properly handles or operates an operating unit 22 according to the received instruction message.

If the user presses the operating unit 22 of the washing machine 1, a signal output command is input to the washing machine 1, a digital signal including product information is generated, the digital signal is converted into a modulated signal through the converter 60, and the modulated signal is output as a predetermined sound signal through the sound output unit 72.

In this case, the sound signal 100 output from the sound output unit 72 is transferred to the service center 200 through a portable terminal 81 connected to a predetermined communication network. For example, the communication network may be a telephone network or a mobile communication network, and the portable terminal 81 may be a telephone or a mobile terminal.

The service center 200 analyzes the sound signal received from the portable terminal 81, and obtains operation information and fault information of the home appliance 1. Therefore, the service center may transmit a solution for obviating a faulty operation of the home appliance 1 to the user, or may dispatch a service technician to the user.

Figure 3:
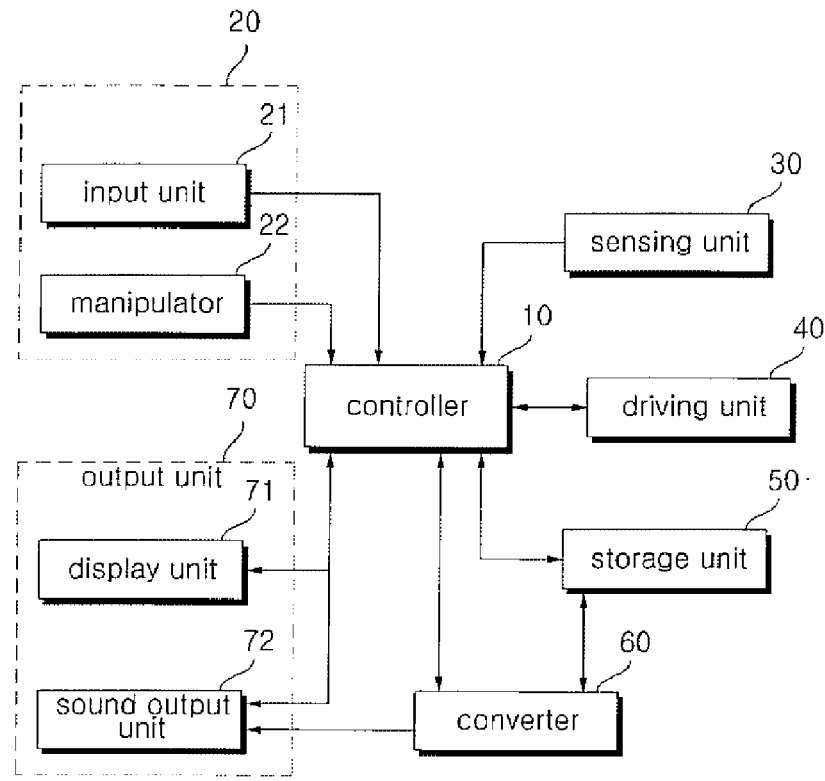
FIG. 3(a) is a block diagram of a home appliance and FIG. 3(b) is a block diagram illustrating a diagnostic server according to one embodiment of the present invention.
Figure 3:
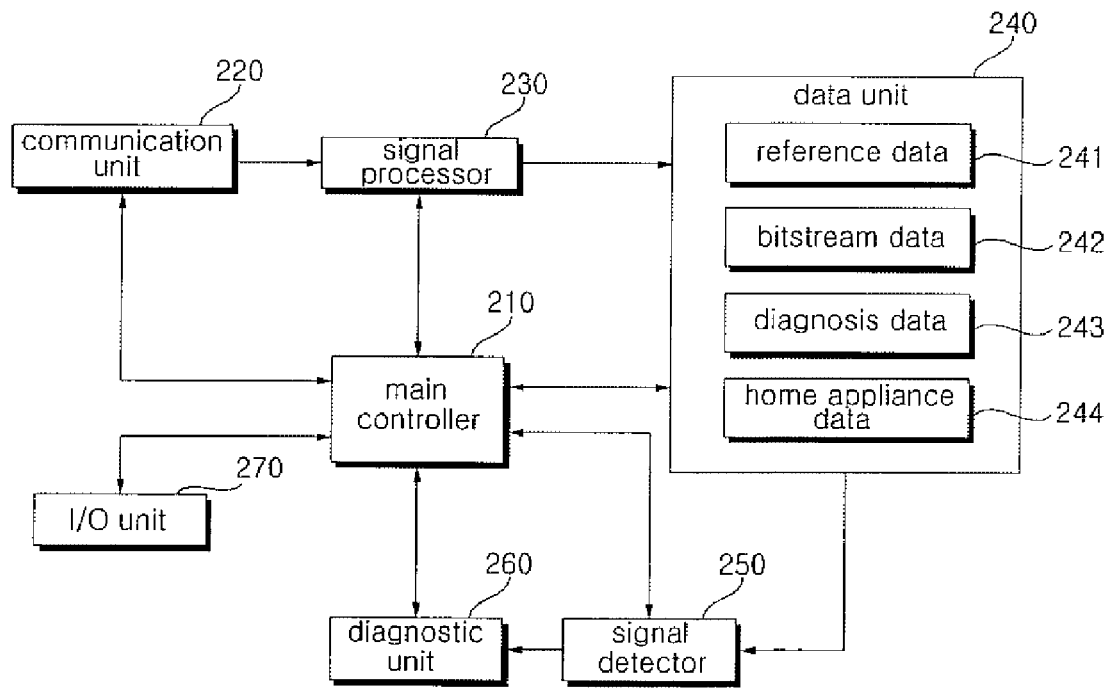

FIG. 3 illustrates a home appliance and a diagnostic server according to one embodiment of the present invention. In more detail, FIG. 3(a) is a block diagram of the home appliance 1 and FIG. 3(b) is a block diagram illustrating the diagnostic server according to one embodiment of the present invention.

The aforementioned washing machine 1 may further include the following control elements. Referring to FIG. 3(a), the washing machine 1 includes an input unit 21, an operating unit 22, a sensing unit 30, a driving unit 40, a storage unit 50, a converter 60, an output unit 70, and a controller 10 for controlling overall operations of the washing machine 1. In this case, the output unit 70 may include a display unit 71 and a sound output unit 72.

The driving unit 40 receives a control command from the controller 10, and thus performs a predetermined operation in response to the received control command. In the case of the washing machine, the driving unit 40 drives and controls a motor for rotating a washing tub or drum in such a manner that pollutants or contaminants can be separated from laundry by rotation of the tub or drum. In addition, upon receiving a control command from the controller 10, the driving unit 40 controls valves to perform a water-supply function or a drainage function.

The sensing unit 30 includes at least one sensor. When the washing machine 1 performs a predetermined action via the driving unit 40, the sensing unit 30 measures data for checking an operation status of the washing machine 1 and transmits the measured data to the controller 10. For example, the sensing unit for use in the washing machine measures a water level in a water-supply mode or a drainage mode, and measures a temperature of the supplied water and a rotation speed of the washing tub or drum.

The storage unit 50 stores operation status data generated when the washing machine 1 performs a predetermined operation, stores operation information (e.g., setup data) received from the input unit 21 to allow the washing machine 1 to perform a predetermined operation, and also stores fault information as to the cause of the fault or the faulty part when a faulty operation occurs in the washing machine 1. In addition, the storage unit 50 stores control data for controlling operations of the washing machine 1 and reference data used for operation control.

The operating unit 22 includes at least one input unit, receives a signal output command for controlling product information to be generated as a predetermined sound signal through the sound output unit 72, and outputs the signal output command to the controller 10. The operating unit 22 receives the signal output command so that it controls the sound output unit 72 to be switched on or off in response to the signal output command. In other words, upon receiving the signal output command from the operating unit 22, the washing machine outputs a predetermined sound signal indicating product information in response to a digital signal generated from the controller 10. In this case, the sound output unit 72 may be used to output the predetermined sound signal.

The input unit 21 may receive setup information related to the output of such a sound signal. In more detail, the input unit 21 may receive a variety of setup values indicating a method for generating a sound signal, a volume of the generated sound signal, etc.

The user input part 20 such as the operating unit 22 or the input unit 21 may be configured to include buttons, a dome switch, a touch pad (including a static-pressure type and an electrostatic type), a jog wheel, a jog switch, a finger mouse, a rotary switch, a jog dial, or the like. Any device is applicable as the input portion 20 so long as it generates predetermined input data by manipulation such as pressure, rotation, contact, etc.

The controller 10 receives a signal output command from the operating unit 22, generates a digital signal including product information by retrieving product information stored in the storage unit 50, applies the generated digital signal to the converter 60, and converts the digital signal including product information into a specific modulated signal. Upon receiving the signal output command from the operating unit 22, the controller 10 controls the sound output unit 72 to be operated.

In this case, the product information may include operation information and fault operation, wherein the operation information includes information about an operation setup and information about an operation status, and the fault operation includes information about a malfunction or faulty operation. The product information may be data composed of a combination of 0s and 1s, and may be a digital signal readable by the controller 10.

The converter 60 converts a digital signal including product information into a modulated signal for outputting a sound signal. In this case, the converter 60 converts the product information denoted by a digital signal into an analog signal having a predetermined frequency band. During the signal conversion, the converter 60 converts a digital signal into a modulated signal using any one of a frequency shift keying (FSK) scheme, an amplitude shift keying (ASK) scheme, and a phase shift keying (PSK) scheme.

In this case, the frequency shift keying scheme converts an input signal into a predetermined-frequency signal in response to a data value of product information. The amplitude shift keying scheme converts an input signal into another signal that has different amplitudes according to data values. The phase shift keying scheme converts an input signal into another signal that has different phases according to data values of product information.

The converter 60 converts a digital signal including product information into a signal of a predetermined frequency band according to the above-mentioned scheme, combines individual modulated signals with each other, and outputs the combined modulation signal.

In this case, the generated sound signal may include product information and a preamble indicating the beginning of data including the product information in a header part of data, and this data includes not only product information but also a check bit for detecting errors in data.

The sound output unit 72 is switched on or off under the control of the controller 10, receives a modulated signal from the converter 60, and thus outputs a predetermined sound signal. For example, the sound output unit 72 may be a speaker or a buzzer to output the sound signal.

The sound output unit 72 outputs a modulated signal as a sound signal. If the output of the sound signal is completed, the sound output unit 72 stops operation. If a signal output command is input to the sound output unit 72 through the operating unit 22, the sound output unit 72 is re-operated so that it outputs a predetermined modulated signal.

In response to a control signal of the controller 10, the display unit 71 displays input information entered by the operating unit 22 and the input unit 21, information about an operation status of the washing machine 1, and information about the completion of a home-appliance operation on the screen. In addition, the display unit 71 displays information about a faulty operation of the home appliance on the screen.

In this case, the output unit 70 may further include the sound output unit 72, the display unit 71, a lamp being switched on or off, a vibration element, and the like, and a detailed description thereof will be omitted herein.

The above-mentioned washing machine 1 outputs a predetermined sound signal, such that it can transmit product information of the washing machine 1 to the service center 200 according to the following description.

If product information of the washing machine 1 is output as a sound signal and is transmitted to the service enter 200 through a telephone network, the product information is input to the diagnostic server of the service center 200 such that the diagnostic server can diagnose a faulty operation of the washing machine 1.

Referring to FIG. 3(b), the diagnostic server may include a communication unit 220, a signal processor 230, a data unit 240, an input/output (I/O) unit 270, a signal detector 250, a diagnostic unit 260, and a main controller 210 for controlling overall operations of the diagnostic server.

The I/O unit 270 may include an input unit pressed by a user of the service center 200, for example, buttons, keys, a touch pad, a switch, etc. The I/O unit 270 may further include a display unit for outputting not only operation information of the diagnostic server but also the diagnosis result. The I/O unit 270 may include an external input device and an interface for accessing a portable memory unit.

If the input unit is pressed or manipulated, the I/O unit 270 transmits a signal to the main controller 210, and allows a sound signal of the washing machine to be transferred from a telephone or portable terminal of a user who connects to a telephone network to the diagnostic server.

The communication unit 220 is connected to a network of the service center so that it transmits and receives data to and from the service center over the network. The communication unit 220 is connected to an external network such as the Internet so that it communicates with the external network. Specifically, if a record command or a reception command is input to the communication unit 220 through the input unit according to a control command of the main controller 210, the communication unit 200 receives a sound signal and transmits the diagnosis result to an external part through a telephone network.

The data unit 240 includes bitstream data 242, reference data 241, and diagnosis data 243. The bitstream data 242 includes control data for operating the diagnostic server and sound-signal data received from the home appliance such as the washing machine. The reference data 241 detects product information of a home appliance from the sound-signal data. The diagnosis data 243 is used to diagnose the presence or absence of a fault and the cause of the fault. The data unit 240 may further include home appliance data 244 indicating the product information of the home appliance detected from the bitstream data 242.

In order to detect a preamble, the reference data 241 includes a reference preamble negotiated with the home appliance 1, information as to the size of a preamble contained in the sound signal generated from the home appliance 1, information as to the size of data, and weight data assigned to the preamble. The weight data may be changed according to the type of a preamble and the importance of each bit of the preamble.

In this case, the data unit 240 receives the reference data 241, the bitstream data 242, the diagnostic data 243, and the home appliance data 244 from the main controller 210, and manages and updates the received data 241 to 244.

The signal processor 230 converts analog data indicating the received sound signal into other data, and stores the converted data as the bitstream data 242. In this case, the signal conversion performed by the signal processor 230 may be identical to inverse conversion of a previous signal conversion performed by the home appliance 1. Preferably, a mutual agreement is provided between each home appliance and the diagnostic server, so that each home appliance and the diagnostic server may perform data conversion using the same signal conversion system. The signal processor 230 may convert an analog signal (i.e., a sound signal) of a predetermined frequency band into a digital signal through inverse conversion based on any one of a frequency shift keying scheme, an amplitude shift keying scheme, and a phase shift keying scheme.

The signal detector 250 firstly detects a preamble indicating the beginning of data from the bitstream converted by the signal processor 230, detects data including product information on the basis of the detected preamble, and transmits the detected data as the home appliance data 244 in the data unit 240.

During the transmission of a sound signal, unexpected signal distortion or data loss may be encountered in the signal detector 250, and noise may be added to the signal detector 250. In order to solve the above-mentioned problems, a plurality of preamble candidates may be generated from the bitstream, each preamble candidate selected from among the plurality of preamble candidates is matched with a reference preamble stored in the reference data 241, and a weight value is applied to such a preamble candidate, such that the signal detector 250 can detect a necessary preamble. In this case, the number of preamble candidates contained in a group of preamble candidates (hereinafter referred to as a preamble candidate group) may be changed according to the preamble size, the data size, and information about a unit required for preamble candidate selection.

The signal detector 250 selects a first preamble candidate group, extracts a second preamble candidate group as to a next time in response to a preamble size and a data size, matches N preamble candidates contained in each candidate group with one another, assigns a weight value to each matching result, and thus selects one preamble candidate having the highest weight to be a preamble.

In accordance with another embodiment of the present invention, the signal detector 250 selects any one of several preamble candidates as a reliable preamble, compares the selected preamble candidate with a preamble of the next time, and thus detects a desired preamble.

In this case, the signal detector 250 detects the preamble-size information and the data-size information from the reference data 241, detects a next preamble in response to preamble-size and data-size information of the reliable preamble, matches the detected next preamble with the reliable preamble, determines whether the detected next preamble is equal to the reliable preamble, and completes the above preamble detection according to the determined result. If the reliable preamble is not identical to a desired preamble, the signal detector 250 re-performs the above operation for selecting such a reliable preamble from among the remaining preamble candidates other than the used preamble candidate, such that it detects the last preamble. In this case, the signal detector 250 selects a reliable preamble in descending numerical order of weight value.

The signal detector 250 detects the preamble as described above. If necessary, the signal detector 250 may detect a preamble using any one of methods according to setup information.

If the preamble detection is completed, the signal detector 250 detects data on the basis of the detected preamble, and stores the detected data as home appliance data 244 in the data unit 240.

The signal detector 250 generates a group of preamble candidates, and compares each preamble-candidate group with a next-time preamble using the matching- and weighting-processes among candidate groups in such a manner that preamble detection is continuously repeated. As a result, the signal detector 250 can detect data including product information of the home appliance 1 from the bitstream.

The diagnostic unit 260 analyzes data detected by the signal detector 250, determines a current status and fault of the home appliance 1 using product information contained in the analyzed data, analyzes the cause of the fault, and finally outputs the diagnosis result of the fault.

The main controller 210 controls transmission and reception of data through the communication unit 220, controls the flow of data through the I/O unit 270, converts the sound signal including product information of the home appliance into other data through the signal processor 230, and controls the signal detector 250 to detect the converted resultant data.

The main controller 210 transmits a control command to each part in such a manner that the diagnostic unit 260 diagnoses a faulty operation of the home appliance using the detected data. The main controller 210 may output a diagnosis result of the diagnostic unit 260 through the I/O unit 270, or may control the diagnosis result to be transmitted through the communication unit 220.

Figure 4:
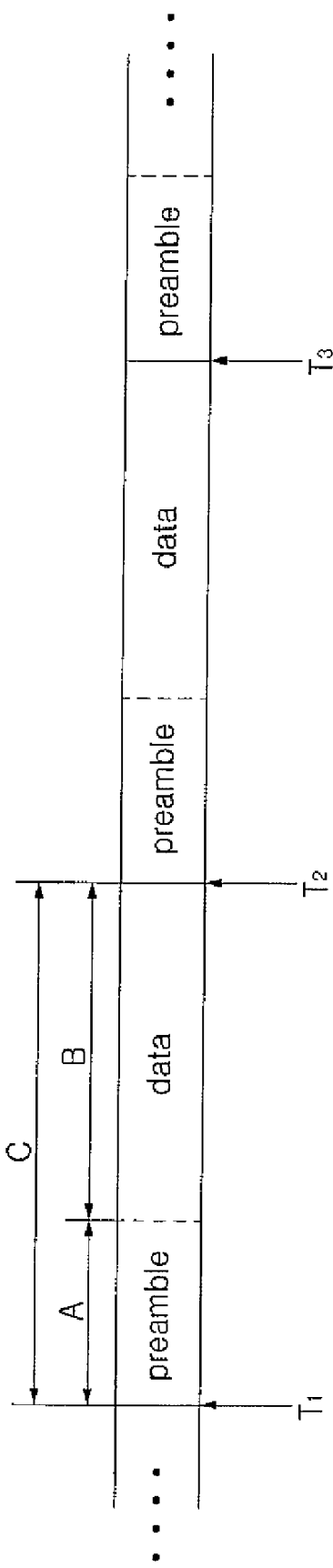
FIG. 4 illustrates a brief structure of a sound signal for use in the home appliance and the diagnostic server according to the present invention.

FIG. 4 illustrates a brief structure of a sound signal for use in the home appliance and the diagnostic server according to the present invention.

Referring to FIG. 4, the home appliance 1 outputs a sound signal. The sound signal includes data having product information and a preamble for detecting data, and a digital signal is formed on the basis of the sound signal. The digital signal may also be output as a sound signal.

In this case, the controller 10 of the home appliance generates a digital signal configured in the form of a packet that is composed of a combination of several data and several preambles. In this case, the size A of each preamble and the size B of data are constant, and the preamble may be repeatedly inserted at intervals of a predetermined distance. In this case, a first time T1, a second time T2, and a third time T3 have the same preamble, but have different data.

The digital signal may be configured to include the product information and the preamble, is converted into a modulated signal of a predetermined frequency by the converter, and is then output as a sound signal through the sound output unit.

The diagnostic server receives the sound signal, detects a preamble, detects data on the basis of the detected preamble, analyzes home-appliance product information contained in the detected data, and thus diagnoses a malfunction or faulty operation of the home appliance.

The signal detector 250 of the diagnostic server detects the preamble. In this case, unexpected distortion or loss of signal may occur in the transmission procedure. In order to solve this problem, the signal detector selects a plurality of preamble candidates, and determines any one of preamble candidates to be a preamble using the matching- and weighting-processes among the preamble candidates.

In this case, the signal detector 250 extracts first and second preamble candidates, and thus extracts a desired preamble using the matching- and weighting-processes of individual candidate groups.

For example, a first preamble candidate group about a first group T1 and a second preamble candidate group about a second group T2 are respectively extracted, and the first preamble candidate group is matched to the second preamble candidate group on a one to one basis. A weight value is applied to each of the same bits between the first and second preamble candidate groups, such that a preamble candidate having the highest weight is set to a preamble of the first time T1.

For another example, the signal detector 250 selects a signal similar to a reference preamble to be a preamble candidate, and thus selects any one of preamble candidates to be a preamble according to the weight application and the matching to a preamble of the next time.

That is, the signal detector 250 selects a reliable preamble from among a plurality of preamble candidates of the first time T1, extracts a preamble of the second time T2 in response to the data size, performs matching on the extracted preamble, and determines whether or not the reliable preamble of the first time T1 is a preamble according to the matching result. In this way, the signal detector 250 detects a preamble and detects data on the basis of the detected preamble.

The diagnostic unit 260 collects data detected by the signal detector 250, i.e., data of the first time T1, data of the second time T2, and data of the third time T3, analyzes the collected data, and diagnoses a malfunction or faulty operation of the home appliance.

Operations of the above-mentioned diagnostic system of the home appliance according to one embodiment of the present invention are as follows. For convenience of description and better understanding of the present invention, it is assumed that the home appliance is a washing machine.

The process for detecting a preamble and data by the diagnostic server according to the present invention will hereinafter be described in detail.

The diagnostic server processes and analyzes an input sound signal, such that it diagnoses the presence or absence of a fault operation in the home appliance. If the sound signal is received in or input to the diagnostic server, the sound signal is converted into the other data by the signal processor 230, such that the other data is stored in the form of bitstream data 242. In this case, the signal processor 230 converts the sound signal composed of sound data into digital data composed of a combination of 0s and 1s, and stores the digital data as a bitstream indicating time-series data.

In response to the control command of the main controller 210, the signal detector 250 generates a preamble candidate on the basis of bitstream data, applies a weight value to the preamble candidate, and matches the weighted preamble candidate with a next preamble, such that it detects a desired preamble. If the preamble is completely detected, the signal detector 250 detects data using the detected preamble, and the diagnostic unit 260 analyzes the collected data. In this case, the detected data includes product information of the home appliance 1, and is stored as home appliance data 244.

The diagnostic unit 260 diagnoses a faulty operation of the home appliance according to the analysis result of the product information contained in the collected data. The main controller 210 may transmit the diagnosis result of the diagnostic unit 260 through the communication unit 220, or may output the diagnosis result through the I/O unit 270. In this case, the diagnostic server may transmit the diagnosis result to either a portable terminal of a service technician or the I/O unit 270, such that the diagnosis result is transferred from the service center to the user.

Therefore, the user of the home appliance receives the diagnosis result, repairs a faulty operation of the home appliance according to the diagnosis result or calls a service technician from the service center to repair the faulty operation. The service technician who visits a home of the user receives the diagnosis result, checks a current status of the home appliance on the basis of the received diagnosis result, and repairs the faulty operation of the home appliance.

Figure 5:
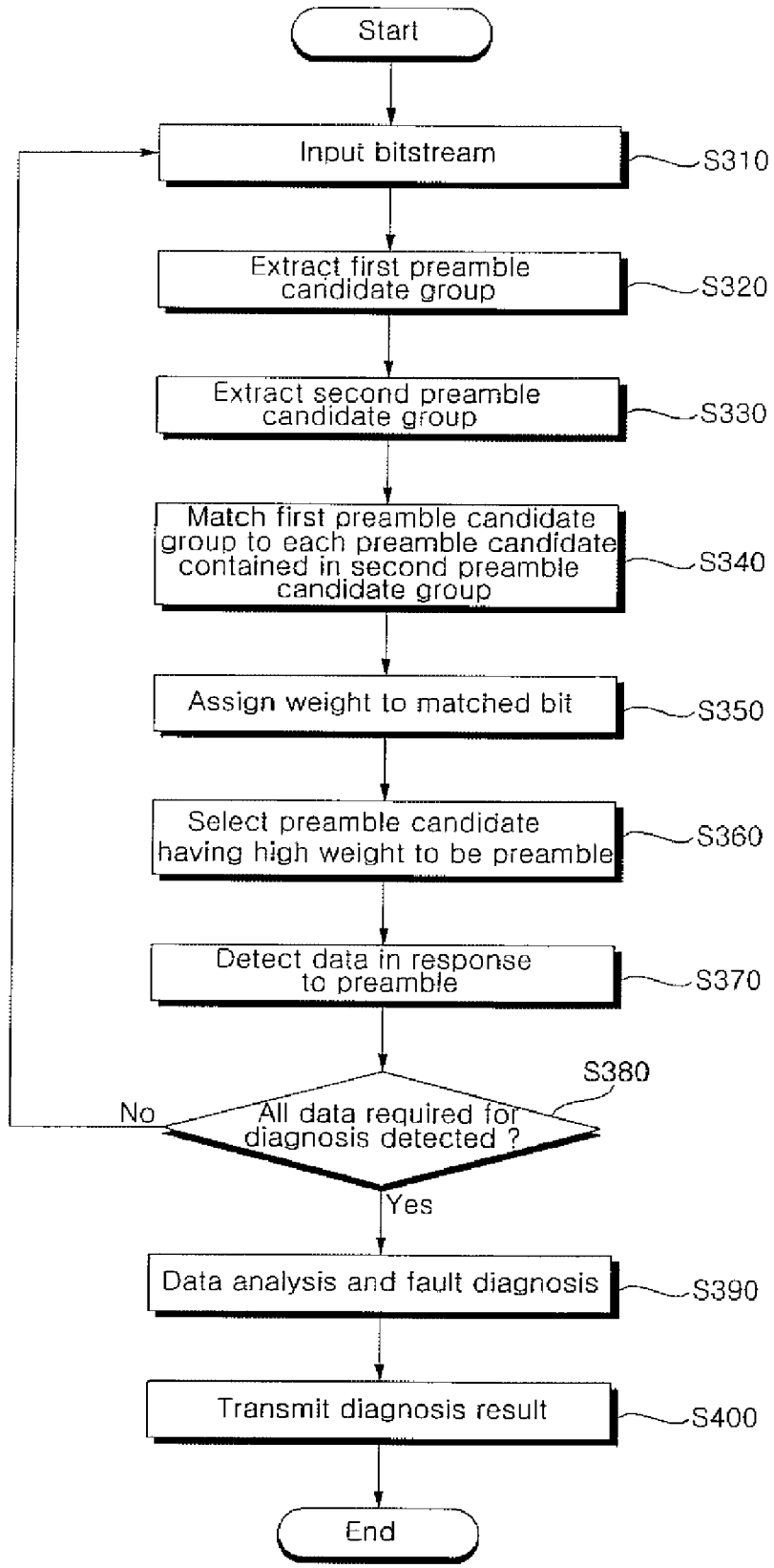
FIG. 5 is a flowchart illustrating a method for detecting a preamble by a diagnostic server according to one embodiment of the present invention.

In this case, the preamble detection and a method for detecting data caused by the preamble detection will hereinafter be described. FIG. 5 is a flowchart illustrating a method for detecting a preamble by a diagnostic server according to one embodiment of the present invention.

Referring to FIG. 5, if a bitstream is input to the diagnostic server at step S310, the signal detector 250 generates N preamble candidates according to a predetermined preamble size, and extracts a first preamble candidate group at step S320.

The signal detector 260 considers the preamble size and the data size on the basis of each preamble candidate contained in the first preamble candidate group, generates N preamble candidates of the second time from a bitstream according to the consideration result, and extracts a second preamble candidate group at step S330.

A plurality of preamble candidates contained in the first preamble candidate group are mapped to a plurality of preamble candidates contained in the second preamble candidate group on a one to one basis at step S340.

The signal detector 260 receives the matching result between the first preamble candidate group and the second preamble candidate group, and applies a weight value to the matched bit at step S350.

In this case, the weight value is predetermined for a preamble, and specific bits may be assigned to individual bits of the preamble. For example, if it is assumed that the preamble is '01110' composed of 5 bits, weight values may be assigned in the order of 1→3→5→3→1 to respective bits.

For example, in the case where a first preamble candidate of the first preamble candidate group is '01001' and a first preamble candidate of the second preamble candidate group is '01111', a first bit, a second bit, and a fifth bit of the first and second preamble candidate group are identical to one another, so that a first weight value '1' of weight values, a second weight value '3' and a fifth weight value '1' are assigned to a first preamble candidate. In this case, a weight value of the first preamble candidate is 5 denoted by the sum of 1, 3 and 1.

A weight is assigned to the matching result between the first and second preamble candidate groups, and one preamble candidate having the highest weight is selected as a preamble at step S360. Data is detected on the basis of the selected preamble at step S370. The signal detector 250 stores the detected data as home appliance data 244 in the data unit 240.

The above-mentioned matching- and weighting-processes between preamble candidate groups are repeatedly carried out until all data needed for diagnosis is completely detected at steps S310 to S380.

If all data needed for diagnosis is selected at step S380, the diagnostic unit 260 analyzes data, diagnoses a current status of the home appliance, a faulty operation, and the reason of the faulty operation on the basis of the analyzed data at step S390.

The main controller 210 may transmit the diagnosis result through the communication unit 220 or may output the diagnosis result through the I/O unit 270 at step S400.

Figure 6:
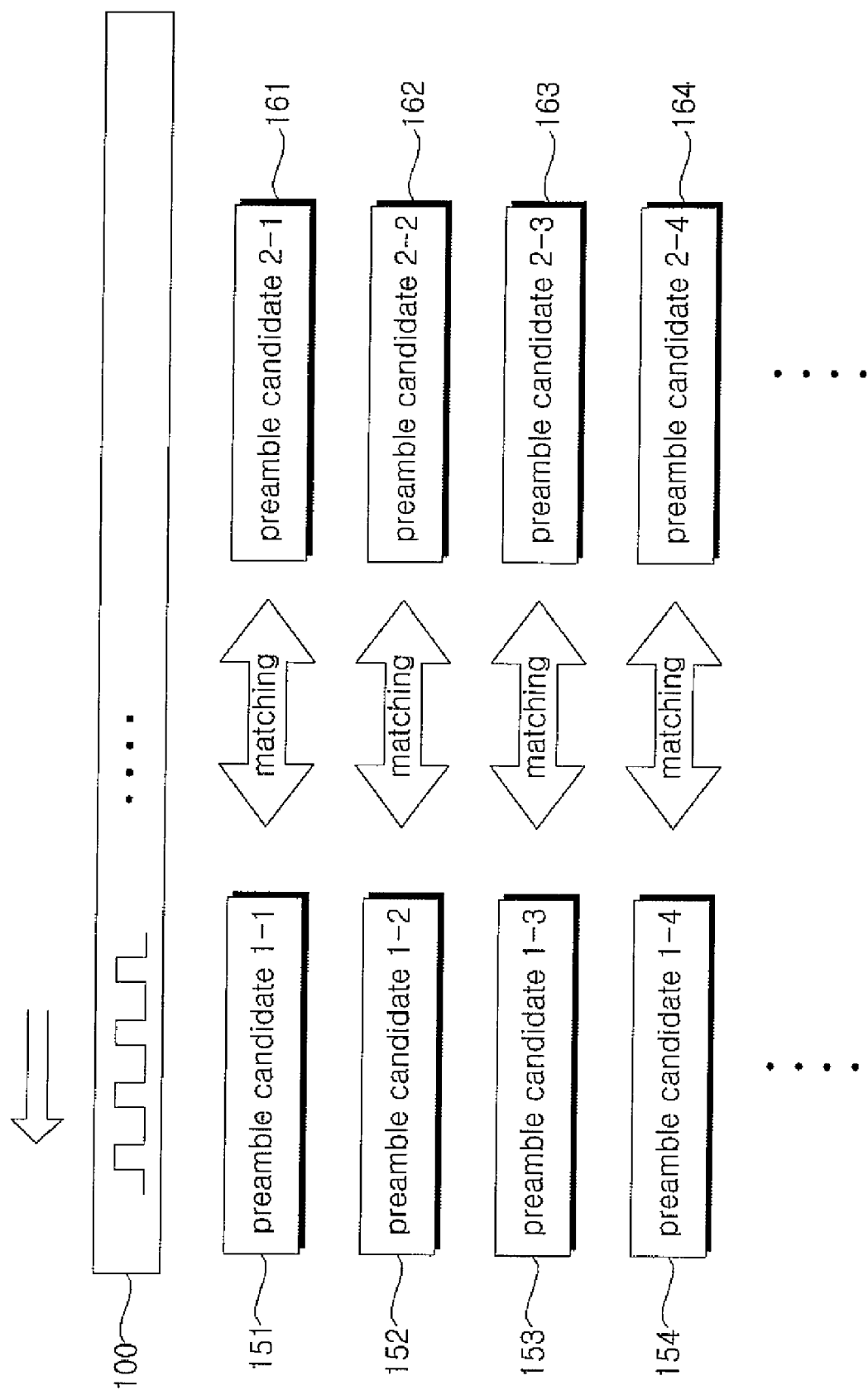
FIG. 6 is a conceptual diagram illustrating an exemplary method for detecting a preamble candidate group in response to the preamble detection illustrated in FIG. 5.

FIG. 6 is a conceptual diagram illustrating an exemplary method for detecting a preamble candidate group in response to the preamble detection illustrated in FIG. 5.

Referring to FIG. 6, the signal detector 250 selects a plurality of preamble candidates of the first time from an input bitstream 100, and extracts the first preamble candidates 151 to 155. In addition, the signal detector 250 selects a plurality of preamble candidates of the second time in response to a predetermined preamble size and a predetermined data size, and extracts second preamble candidates 161 to 165.

The signal detector 250 may map preamble candidates contained in the first preamble candidate groups 151 to 155 to preamble candidates contained in the second preamble candidate groups 161 to 165 on a one to one basis, and may determine whether or not individual bits are identical to each other.

The signal detector 250 assigns a predetermined weight to each of the same bits according to the matching result of respective preamble candidates, and establishes a weight for each preamble candidate on the basis of the sum of weight values respective bits. For example, the weight values for preambles may be assigned in the order of 1→3→5→3→1 to respective bits.

If the weight values are assigned to respective bits, weight values of individual preamble candidates are compared with one another, and thus one preamble candidate having the highest weight is determined to be a preamble.

Figure 7:
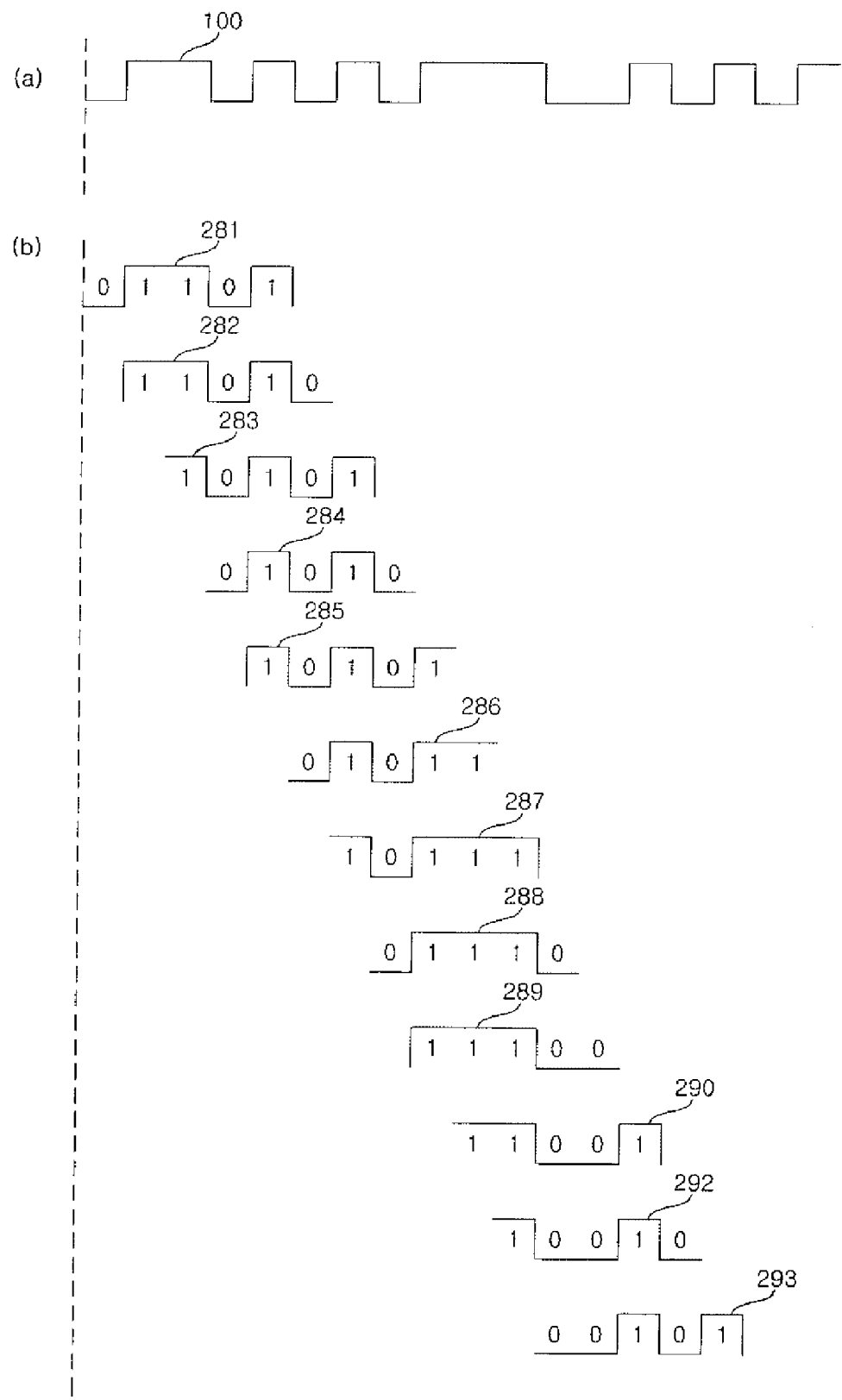
FIG. 7 is a conceptual diagram illustrating a method for detecting a preamble using not only a matching action between preamble candidates but also a weight application according to the present invention.

The method for selecting the preamble candidate from the bitstream is described as follows. FIG. 7 illustrates exemplary preamble candidates for preamble detection of the diagnostic server according to one embodiment of the present invention. FIG. 7(a) illustrates an example of a bitstream, and FIG. 7(b) illustrates an example of a preamble candidate group.

If the bitstream is input as shown in FIG. 7(a), the signal detector 250 selects a preamble candidate as shown in FIG. 7(b), and extracts a preamble candidate group including a plurality of preamble candidates.

A reference preamble is composed of 5 bits in the case of selecting the preamble candidate, so that a first preamble candidate 281 is set to '01101', and a second preamble candidate 282 is sequentially set to '11010' on the basis of the next bit. In this manner, the third, fourth and fifth preamble candidates 283, 284 and 285 are selected, and N preamble candidates 281 to 293 are determined to be one preamble candidate group.

In this case, the signal detector 250 selects a preamble candidate at intervals of one bit, and may decide a different preamble candidate according to setup information. In other words, a first preamble candidate is set to '01101', and a second preamble candidate is set to '01010' at intervals of 3 bits (281 and 284).

The number of preamble candidates may be changed according to the preamble size, the data size, and information regarding a unit required for selecting a preamble candidate.

Figure 8:
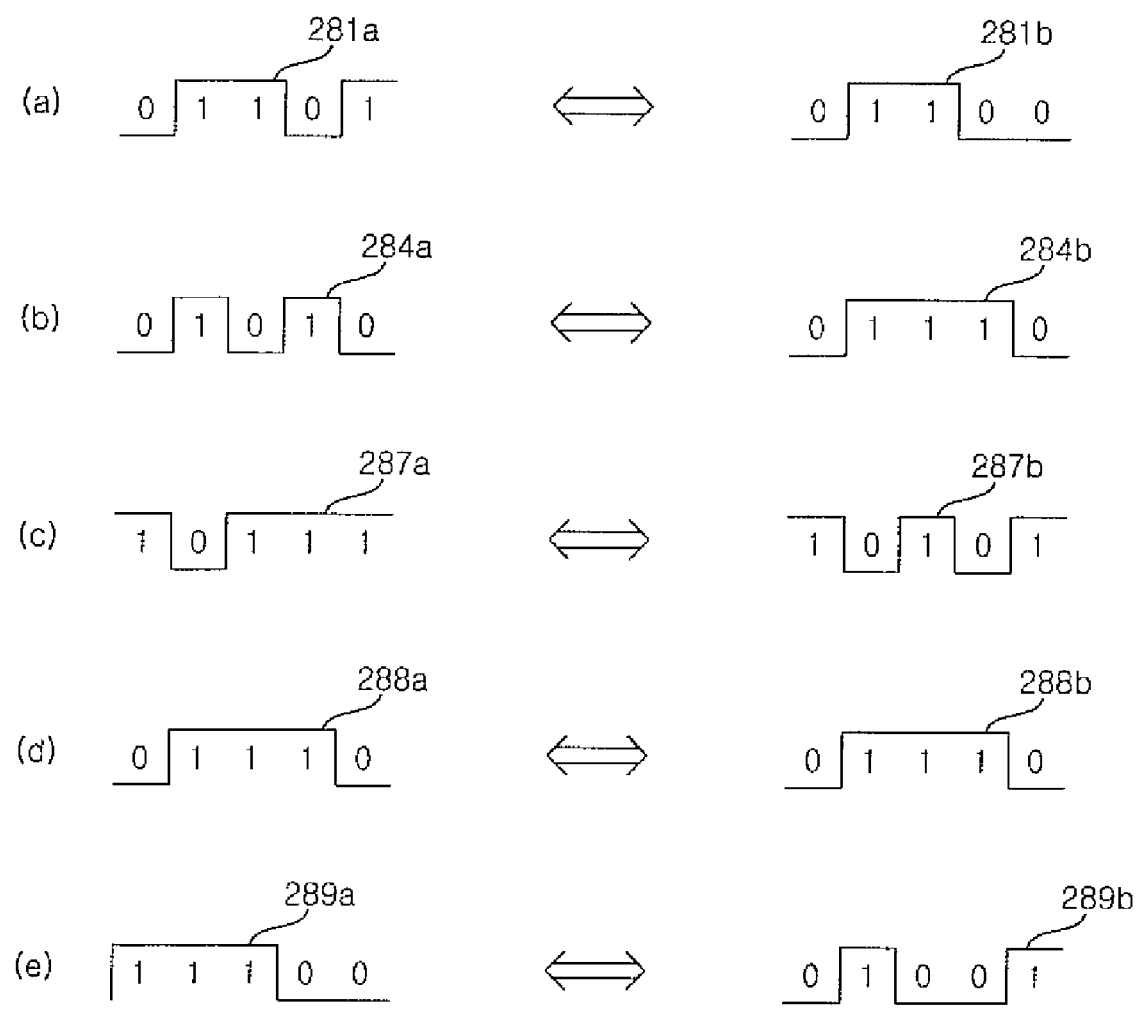
FIG. 8 illustrates exemplary preamble candidates for preamble detection of the diagnostic server according to one embodiment of the present invention.

FIG. 8 is a conceptual diagram illustrating a method for detecting a preamble using not only a matching action between preamble candidates but also a weight application according to the present invention. FIG. 8 illustrates that two candidate groups are formed and a preamble is detected in response to each weight.

In this case, the method for selecting a preamble from a bitstream shown in FIG. 7 is identical to that of FIG. 8.

Referring to FIG. 8, the first preamble candidate group includes a first preamble candidate 281a, a second preamble candidate 284a, a third preamble candidate 287a, a forth preamble candidate 288a, and a fifth preamble candidate 289a. And the second preamble candidate group includes a first preamble candidate 281b, a second preamble candidate 284b, a third preamble candidate 287b, a forth preamble candidate 288b, and a fifth preamble candidate 289b.

Referring to FIG. 8(a), in the case where the first preamble candidate 281a of the first preamble candidate group is set to '01101', and the first preamble candidate 281b of the second preamble candidate group is set to '01100', a first bit, a second bit, a third bit, and a fourth bit of the first preamble candidate 281a are identical to those of the first preamble candidate 281b, weight values are assigned in the order of 1→3→5→3 to the first bit, the second bit, the third bit, and the fourth bit, such that the sum '12' of weight values 1, 3, 5 and 3 is set to a weight value of the first preamble candidate 281a.

Referring to FIG. 8(b), in the case where the second preamble candidate 284a of the first preamble candidate group is set to '01010', and the second preamble candidate 284b of the second preamble candidate group is set to '01110', a first bit, a second bit, a fourth bit, and a fifth bit of the second preamble candidate 284a are identical to those of the second preamble candidate 284b, weight values are assigned in the order of 1→3→3→1 to the first bit, the second bit, the fourth bit, and the fifth bit, such that the sum '8' of weight values 1, 3, 3 and 1 is set to a weight value of the second preamble candidate 284a.

Referring to FIG. 8(c), in the case where the third preamble candidate 287a of the first preamble candidate group is set to '10111', and the third preamble candidate 287b of the second preamble candidate group is set to '10101', a first bit, a second bit, a third bit, and a fifth bit of the third preamble candidate 287a are identical to those of the third preamble candidate 287b, weight values are assigned in the order of 1→3→5→1 to the first bit, the second bit, the third bit, and the fifth bit, such that the sum '10' of weight values 1, 3, 5 and 1 is set to a weight value of the third preamble candidate 287a.

Referring to FIG. 8(d), in the case where the fourth preamble candidate 288a of the first preamble candidate group is set to '01110', and a fourth preamble candidate 288b of the second preamble candidate group is set to '01110', five bits of the fourth preamble candidate 288a are identical to those of the fourth preamble candidate 288b, weight values are assigned in the order of 1→3→5→3→1 to the five bits, such that the sum '13' of weight values 1, 3, 5, 3 and 1 is set to a weight value of the fourth preamble candidate 288a.

Referring to FIG. 8(e), in the case where the fifth preamble candidate 289a of the first preamble candidate group is set to '11100', and the fifth preamble candidate 289b of the second preamble candidate group is set to '01001', a second bit and a fourth bit of the fifth preamble candidate 289a are identical to those of the fifth preamble candidate 289b, a weight value of '3' is assigned to each of the second bit and the fourth bit, such that the sum '6' of weight values 3 and 3 is set to a weight value of the fifth preamble candidate 289a.

The signal detector 250 compares individual preamble candidates 281a, 284a, 287a, 288a, and 289a of the first preamble candidate group with individual preamble candidates 281b, 284b, 287b, 288b, and 289b of the second preamble candidate group, assigns a preamble weight to each matched bit, and thus determines one preamble candidate having the highest weight from among several preamble candidates to be a preamble.

In other words, the fourth preamble candidate '01110' is set to a preamble of the first time.

In this case, if the same preamble candidate is not present the same manner as in the fourth preamble candidate, a first preamble candidate 281a '01101' having a second highest weight is set to a preamble of the first time.

If the preamble is detected, the signal detector 250 detects data in response to a predetermined preamble and a predetermined data size using the detected preamble. In other words, if the fourth preamble candidate 288a is determined to be a preamble, a bitstream is detected as data according to the size of data starting from the end part of the fourth preamble candidate 288a.

The signal detector repeatedly detects the preamble and the data using the above-mentioned scheme, and stores the detected data. If data is collected, the diagnostic unit 260 analyzes the collected data, diagnoses a current status and a faulty operation of the home appliance using product information contained in the analyzed data, and also diagnoses the cause of the faulty operation.

Figure 9:
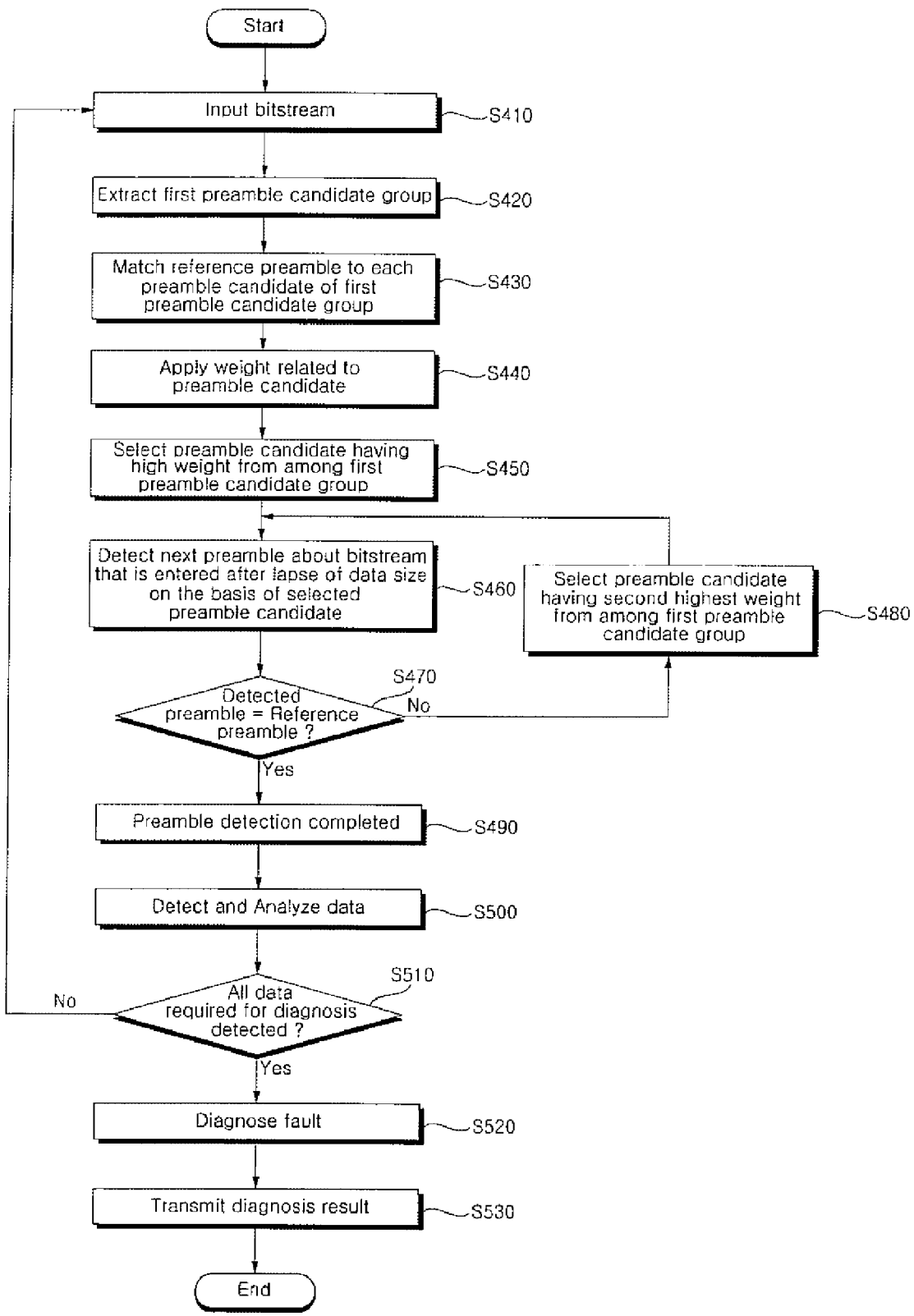
FIG. 9 is a flowchart illustrating a method for detecting a preamble by a diagnostic server according to another embodiment of the present invention.

FIG. 9 is a flowchart illustrating a method for detecting a preamble by a diagnostic server according to another embodiment of the present invention. FIG. 9 is a flowchart illustrating a preamble detection method when a reference preamble is present.

Referring to FIG. 9, when the signal detector 250 detects a preamble of the first time in regard to an input bitstream, it generates a plurality of preamble candidates, and thus extracts a first preamble candidate group at step S420.

In this case, the signal detector 250 generates a first preamble candidate according to a predetermined preamble size, generates a second preamble candidate, and extracts N preamble candidates as a first preamble candidate group.

The signal detector 250 matches a reference preamble to a plurality of preamble candidates of the first preamble candidate group at step S430, and applies a weight value assigned to the preamble to a preamble candidate at step S440.

In this case, a reference preamble is predetermined, a weight value is predetermined for each preamble, and different weight values are assigned to individual bits of the preamble. For example, a reference preamble is set to '01110' composed of 5 bits, and weight values for each preamble may be assigned in the order of 1→3→5→3→1 to individual bits.

In the case where the first preamble candidate is set to '01001', and is matched with the reference preamble '01110', the first bit and the second bit of the first preamble candidate are matched with those of the reference preamble. Accordingly, a first weight value of 1 and a second weight value of 3 are applied so that a weight value of the first preamble candidate is identical to the sum '4' of the first and second weight values 1 and 3.

In response to the matching result and the weight application result, one preamble candidate having a high bit matching rate and a high weight is selected to be a reliable preamble at step S450. In consideration of a predetermined size and a predetermined data size that are determined on the basis of the reliable preamble, the signal detector 250 detects a preamble of the second time from the bitstream at step S460.

The detected preamble of the second time is matched with the first-time reliable preamble selected by a weight value, and determines whether the second-time preamble is identical to the first-time reliable preamble at step S470. In this case, the second-time preamble is a temporary value.

In this case, if the reliable preamble of the first time is not identical to the preamble of the second time, the signal detector 250 selects one preamble candidate having the second highest weight from among the first preamble candidate group, and determines the selected preamble candidate to be a reliable preamble at step S480.

A preamble of the second time is again detected on the basis of the re-selected reliable preamble, and the second-time preamble is compared with the reference preamble at steps S460 and S470. In this case, the signal detector 250 extracts a preamble of the second time in association with a plurality of preamble candidates, each of which has a weight value that is equal to or higher than a predetermined value, performs the matching process between the extracted preamble and the reference preamble, and thus selects a preamble according to the matching result.

A weight value is assigned to the matching result between the reference preamble and the second-time preamble. One reliable preamble having the highest weight is finally set to a preamble of the first time, and the first-time preamble is completely detected at step S490. If the re-selected reliable preamble is not identical, the process for selecting a preamble candidate according to each weight and the process for comparing the selected preamble candidate with the next preamble are repeated as described above.

The signal detector 250 detects data according to the detected preamble, and stores the detected data as home appliance data 244.

Thereafter, the signal detector 250 repeatedly performs the preamble detection and the data detection (S410 to S500) in association with a bitstream continued until all data needed for diagnosis is collected at step S510.

If all data required for diagnosis is detected at step S510, the diagnostic unit 260 analyzes data, and thus diagnoses the presence or absence of a faulty operation in the home appliance and the cause of the faulty operation at step S520.

The main controller 210 may output or transmit the diagnosis result as described above at step S530.

Figure 10:
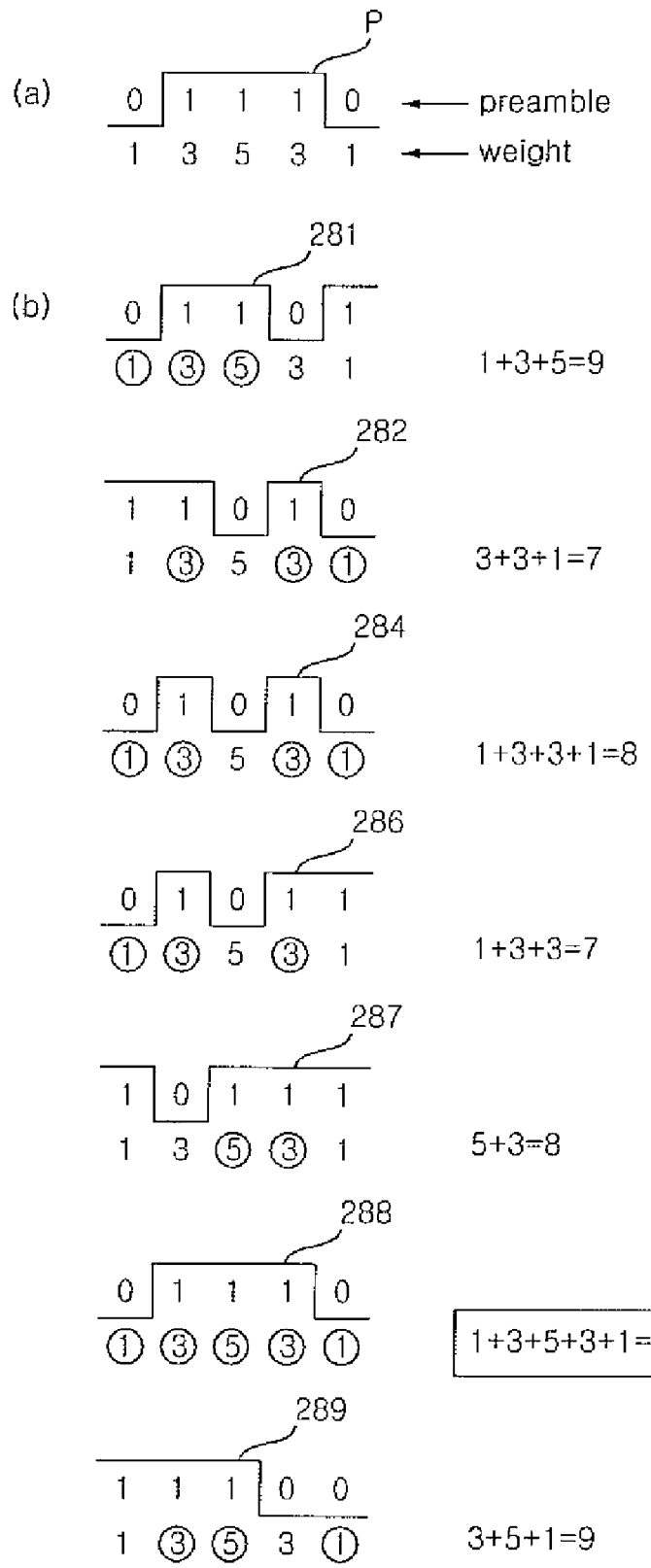
FIGS. 10(a) and 10(b) illustrate exemplary methods for detecting a preamble by a diagnostic server using the preamble detection method illustrated in FIG. 9.

FIGS. 10(a) and 10(b) illustrate exemplary methods for detecting a preamble by a diagnostic server using the preamble detection method illustrated in FIG. 9.

As shown in FIG. 9, if a reference preamble is present, the signal detector 250 of the diagnostic server extracts a preamble candidate using the reference frame, selects a preamble on the basis of the extracted preamble candidate, and detects data.

For convenience of description and better understanding of the present invention, it is assumed that the reference preamble is set to '01110' composed of bits, and the matching- and weighting-processes between individual preamble candidates, and the last preamble selection will be described in detail. In addition, the preamble candidate for the bitstream 100 that is input as shown in FIG. 8 is selected, a preamble candidate group including a plurality of preamble candidates is extracted, and a detailed description thereof will hereinafter be described in detail.

Since the reference preamble is composed of 5 bits in the process for selecting a preamble candidate, a first preamble candidate 281 is set to '01101', and a second preamble candidate 282 from the next bit is set to '11010'. In this manner, third, fourth, and fifth preamble candidates 283, 284 and 285 are selected, and N preamble candidates (281 to 293) are selected to be one preamble candidate group. In this case, the signal detector 250 selects a preamble candidate at intervals of one bit, and may select a different preamble candidate according to setup information as necessary.

FIG. 10(a) shows exemplary weight values assigned to a preamble. In FIG. 10(a), it is assumed that the weight values are assigned in the order of 1→3→5→3→1 to the preamble. FIG. 10(b) shows only preamble candidates, each of which matches the reference preamble to a high degree, from among a plurality of preamble candidates shown in FIG. 7(b).

The signal detector 250 assigns a weight value shown in FIG. 10(a) to the matching result between each preamble candidate shown in FIG. 10(b) and the reference preamble.

If the first preamble candidate 281 denoted by '01101' is matched to the reference preamble '01110', first to third bits (0, 1 and 1) of the first preamble candidate 281 are matched to those of the reference preamble '01110', so that the sum '9' of 1, 3, and 5 is set to a weight value of the first preamble candidate 281.

In the second preamble candidate 282 denoted by '11010', second, fourth, and fifth bits of the second preamble candidate 282 are matched to those of the reference preamble '01110', and weight values are assigned in the order of 3→3→1 to the second bit, the fourth bit and the fifth bit, so that the sum '7' of the weight values 3, 3 and 1 is set to a weight value of the second preamble candidate 282.

In this manner, a weight value of 8 is assigned to a fourth preamble candidate 284, a weight value of 7 is assigned to a sixth preamble candidate 286, a weight value of 8 is assigned to a seventh preamble-candidate 287, a weight value of 13 is assigned to an eighth preamble candidate 288, and a weight value of 9 is assigned to a ninth preamble candidate 289.

The eighth preamble candidate 288 having the highest weight is selected to be a reliable preamble.

If the eighth preamble candidate 288 is selected to be such a reliable preamble, the signal detector 250 detects a preamble of the second time according to the preamble size and the data size on the basis of the eighth preamble candidate 288.

In this case, if the second-time preamble detected on the basis of the eighth preamble candidate is determined to be '01110' 288, the eighth preamble candidate serving as the reliable preamble is controlled to be matched to the second-time preamble '01110' 288. If the eighth preamble candidate is matched to the second-time preamble, the eighth preamble candidate serving as the reliable preamble is finally set to the first-time preamble.

If unexpected distortion or loss occurs in a signal when the signal is transmitted, and if a preamble candidate (such as the eighth preamble candidate) identical to the reference preamble is not present, one preamble candidate having a high weight from among several preamble candidates shown in FIG. 8(b) is determined to be a reliable preamble, a preamble of the second time is detected, and a preamble is finally selected according to the matching result between the reliable preamble and the second-time preamble.

In other words, except for the eighth preamble candidate 288 having the highest weight, each of the first preamble candidate 281 and the ninth preamble candidate 289 has a second highest weight, such that each of the first preamble candidate 281 and the ninth preamble candidate 289 is selected to be a reliable candidate, and a preamble of the second time can be selected on the basis of the selected reliable preamble. In this case, a plurality of reliable preambles may be selected from preamble candidates, each of which has a high weight, and a predetermined rate may be assigned to a reliable preamble in descending numerical order of weight.

For example, if the first preamble candidate 281 is used and a preamble of the second time is set to '01100', the second-time preamble '01100' is matched to the first preamble candidate 281 denoted by '01101', so that a weight value of 10 is provided. If a fourth preamble candidate 284 is used and a preamble of the second time is set to '01110', a weight value of 13 is provided. If a seventh preamble candidate 287 is used and a preamble of the second time is set to '10101', a weight value of 5 is provided. If a ninth preamble candidate 289 is used and a preamble of the second time is set to '01001', a weight value of 4 is provided.

If the eighth preamble candidate is not present, the fourth preamble candidate 284 having a high weight is determined to be a preamble. In the case of the fourth preamble candidate 284, an unexpected error may occur in a third bit of the first-time preamble.

In this case, a preamble candidate of the first time and a preamble candidate of the second time are summed, such that a preamble may be selected according to the sum of the two preamble candidates. Although a selected preamble may be changed according to the preamble format, a weight value of a specific part where a signal distortion or loss may be easily generated is reduced, and a weight value of a bit important to the preamble recognition is increased, thereby preventing the selected preamble from being changed to another.

In conclusion, the system and method for diagnosing the home appliance according to the present invention detect a preamble using the relationship between a next preamble and a previous preamble, and effectively detect a preamble, resulting in increased accuracy of data detection. In addition, data detection is correctly performed so that an erroneous diagnosis of the home appliance is prevented and the home appliance can be quickly and correctly diagnosed.

As is apparent from the above description, the diagnostic system and method for the home appliance according to the present invention can effectively detect data including substantial home appliance information by correctly detecting a preamble from a signal received from the home appliance. As a result, the diagnostic system or method for the home appliance can quickly analyze and diagnose data, prevent a misdiagnosis caused by incorrect data, greatly increase the accuracy of diagnosis of a current status of the home appliance, and also increase user satisfaction and reliability in terms of the service for diagnosing a malfunction or faulty operation.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A diagnostic system for a home appliance, comprising:
at least one home appliance that outputs a sound signal including product information; and
a diagnostic server that receives the sound signal from the home appliance and diagnoses a faulty operation of the home appliance using the received sound signal, wherein the diagnostic server extracts a plurality of preamble candidates from the sound signal, detects a preamble for identifying the product information from the plurality of preamble candidates, extracts product information contained in the sound signal, and thus diagnoses a current status of the home appliance, a faulty operation, and a cause of the faulty operation, wherein the diagnostic server includes:
a signal detector that performs matching and weighting processes between the plurality of preamble candidates so as to detect the preamble from the plurality of preamble candidates, and extracts the product information using the preamble; and
a diagnostic device that diagnoses a current status of the home appliance, a faulty operation, and a cause of the faulty operation by analyzing the product information, wherein the signal detector extracts a first plurality of preamble candidates of a first time to form a first preamble candidate group, extracts a second plurality of preamble candidates of a second time according to not only data including the product information but also a preamble size to form a second preamble candidate group, and matches each preamble candidate of the first preamble candidate group to each preamble candidate of the second preamble candidate group on a one to one basis.

2. The diagnostic system according to claim 1, wherein the signal detector assigns a weight value to a matched bit caused by the one-to-one matching result, and sets a preamble candidate having a high sum of weight values of individual bits to the preamble.

3. The diagnostic system according to claim 1, wherein the signal detector, in response to a predetermined preamble size and a predetermined data size, detects the product information according to the predetermined data size starting from an end part of the preamble.

4. The diagnostic system according to claim 3, wherein the predetermined preamble size and predetermined data size are stored in a data device.

5. The diagnostic system according to claim 1, wherein the home appliance includes:
- a controller that, upon receiving a signal output command, divides the product information into a plurality of data units, inserts the preamble between the divided data units, generates a digital signal of a predetermined format, and generates a signal to output the sound signal;
- a converter that converts the digital signal into a modulated signal having a predetermined frequency band; and
- a sound output device that outputs the modulated signal as a sound signal in response to the digital signal output by the controller.

6. A diagnostic method for use in a diagnostic system of a home appliance, the diagnostic method comprising:
- upon receiving in a diagnostic server a sound signal from a home appliance, extracting a plurality of preamble candidates from the sound signal;
- detecting via the diagnostic server a preamble from the plurality of preamble candidates by performing matching and weighting processes between the plurality of preamble candidates;
- detecting via the diagnostic server data including product information from the sound signal on the basis of the preamble; and
- diagnosing via the diagnostic server the home appliance by analyzing the product information, wherein the detecting of the preamble includes:
  - extracting a first plurality of preamble candidates of a first time and a second plurality of preamble candidates of a second time; and
  - matching the plurality of first preamble candidates to the plurality of second preamble candidates on a one to one basis.

7. The diagnostic method according to claim 6, wherein the detecting of the preamble includes:
- assigning a predetermined weight to a matched bit according to the one-to-one matching result; and
- determining one preamble candidate having a highest sum of assigned weights to be the preamble of the first time.

8. The diagnostic method according to claim 6, wherein, upon detection of the preamble, the detecting of the data includes:
- in response to a predetermined preamble size and a predetermined data size, detecting the data according to the predetermined data size starting from an end part of the preamble.

9. The diagnostic system according to claim 1, wherein the diagnostic device collects data detected by the signal detector for each of the first time and second time, analyzes the collected data, and diagnoses a malfunction or fault operation of the home appliance using the data.

10. The diagnostic system according to claim 1, wherein the matching and weighting processes are carried out until all data needed for diagnosis is collected.

11. The diagnostic system according to claim 1, wherein the diagnostic server converts the sound signal into bitstream data and the signal detector extracts the plurality of preamble candidates from the bitstream data.

* * * * *